US012607048B2

(12) United States Patent
Bendel et al.

(10) Patent No.: US 12,607,048 B2
(45) Date of Patent: Apr. 21, 2026

(54) MOTOR VEHICLE, IN PARTICULAR ELECTRIC MOTOR VEHICLE OR HYBRID MOTOR VEHICLE

(71) Applicant: KIEKERT AKTIENGESELLSCHAFT, Heiligenhaus (DE)

(72) Inventors: Thorsten Bendel, Oberhausen (DE); Tobias Klocke, Mettmann (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 15 days.

(21) Appl. No.: 18/840,542

(22) PCT Filed: Jan. 16, 2023

(86) PCT No.: PCT/DE2023/100027
§ 371 (c)(1),
(2) Date: Aug. 22, 2024

(87) PCT Pub. No.: WO2023/169618
PCT Pub. Date: Sep. 14, 2023

(65) Prior Publication Data

US 2025/0179844 A1 Jun. 5, 2025

(30) Foreign Application Priority Data

Mar. 8, 2022 (DE) ..................... 10 2022 105 353.9

(51) Int. Cl.
*E05B 81/82* (2014.01)
*E05B 77/02* (2014.01)

(52) U.S. Cl.
CPC .............. *E05B 81/82* (2013.01); *E05B 77/02* (2013.01)

(58) Field of Classification Search
CPC .......... E05B 81/82; E05B 81/90; E05B 81/80; E05B 81/00; E05B 81/04; E05B 81/06; E05B 77/02
See application file for complete search history.

(56) References Cited

U.S. PATENT DOCUMENTS

2013/0311046 A1* 11/2013 Heberer .................. E05B 81/82 701/45
2019/0061654 A1* 2/2019 Tsuji ....................... B60R 16/03
2020/0406764 A1 12/2020 Konno

FOREIGN PATENT DOCUMENTS

DE 69509316 T2 8/1999
DE 102005054111 A1 5/2007
(Continued)

OTHER PUBLICATIONS

Machine translation and numbered paragraphs for DE 102014105873 A1 (Year: 2015).*
(Continued)

*Primary Examiner* — Christine M Mills
*Assistant Examiner* — Christopher F Callahan
(74) *Attorney, Agent, or Firm* — Renner, Otto, Boisselle, & Sklar, LLP.

(57) ABSTRACT

A motor vehicle, in particular electric motor vehicle or hybrid motor vehicle, is equipped with at least one electromotively actuatable motor vehicle lock, and with at least one on-board battery and with an emergency battery for application of an electromotive drive of the motor vehicle lock during normal operation and during emergency operation. According to the invention, the emergency battery is provided with an emergency protection device.

19 Claims, 2 Drawing Sheets

(56) References Cited

FOREIGN PATENT DOCUMENTS

| | | | | | |
|---|---|---|---|---|---|
| DE | 102013007154 | A1 | * | 11/2013 | ............. E05B 77/02 |
| DE | 102014105873 | A1 | * | 10/2015 | ............. E05B 81/86 |
| DE | 102014220033 | A1 | | 4/2016 | |
| DE | 102019122107 | A1 | | 2/2021 | |
| DE | 102021123099 | A1 | | 3/2023 | |
| EP | 3620321 | A1 | | 3/2020 | |
| GB | 2496503 | A | * | 5/2013 | ............. E05B 81/04 |
| JP | 2000064685 | A | * | 2/2000 | |
| KR | 20150015051 | A | | 2/2015 | |

OTHER PUBLICATIONS

Machine translation and numbered paragraphs of JP 2000064685 A (Year: 2000).*

Machine translation and numbered paragrpahs of DE 102013007154 A1 (Year: 2013).*

International Search Report mailed Mar. 30, 2023, for priority International Application No. PCT/DE2023/100027.

* cited by examiner

MOTOR VEHICLE, IN PARTICULAR ELECTRIC MOTOR VEHICLE OR HYBRID MOTOR VEHICLE

This application is a national phase of International Patent Application No. PCT/DE2023/100027 filed Jan. 16, 2023, which claims priority to German Patent Application No. 10 2022 105 353.9 filed Mar. 8, 2022, each of which is hereby incorporated herein by reference in its entirety.

FIELD OF DISCLOSURE

The invention relates to a motor vehicle, in particular an electric motor vehicle or hybrid motor vehicle, with at least one electromotively actuatable motor vehicle lock, and with at least one on-board battery and an emergency battery for energizing an electromotive drive of the motor vehicle lock during normal operation and during emergency operation.

BACKGROUND OF DISCLOSURE

Electromotively actuatable motor vehicle locks are usually designed in such a manner that the electric motor can be used to open a mandatory locking mechanism consisting of a catch and pawl. To do this, the pawl is lifted from its engagement with the catch so that a locking bolt previously caught by the catch is released. The associated motor vehicle door can be opened. In principle, the electromotive drive for the motor vehicle lock can also be used and operate in such a manner that the previously mentioned locking mechanism is unlocked with its help and can subsequently be opened mechanically, for example.

Either way, normal operation of such a motor vehicle and the associated motor vehicle lock requires that the electromotive drive be supplied with sufficient electrical energy by means of the on-board battery in order to be able to open the locking mechanism electromotively in the example case described or at least to ensure unlocking. If such a motor vehicle is involved in an accident or crash, the system switches to emergency mode. The same applies if the on-board battery has failed. In emergency mode, the additional emergency battery provides power to the electromotive drive of the motor vehicle lock instead of the on-board battery.

In this manner, the motor vehicle lock in question can also be opened or at least unlocked electromotively using the emergency battery in emergency mode or in an emergency. This is necessary in order to enable rescue personnel arriving at the motor vehicle after such an accident or crash to open the motor vehicle door and thus gain access to any passengers inside the motor vehicle who may need care.

In the prior art according to KR 10-2015-0015 051 A, an electric lock is supplied with the necessary electrical energy during normal operation using the on-board battery. An additional external emergency power source is also implemented, which can be connected via a USB port, for example.

The generic prior art according to DE 695 09 316 T2 relates to an arrangement consisting of a motor vehicle door and an associated electric door lock. The electric door lock is opened by actuating an actuating element which is powered by the vehicle battery or the on-board battery. In the event of a malfunction in the power supply of the aforementioned on-board battery, the electric door lock can be opened by the power supply provided by a backup battery. For this purpose, the backup battery is arranged in the associated motor vehicle door to which the electric door lock belongs. This has proven in principle to be successful.

In practice, however, the additional realization of a backup battery or emergency battery inside the motor vehicle door or inside a lock housing of the motor vehicle lock not only leads to increased costs, but also to an increased weight of the motor vehicle door in question or of the motor vehicle lock or of both. This is disadvantageous in that the motor vehicle door must be opened by a user, which results in increased operating forces.

In addition, the proper functioning of the emergency battery must be guaranteed for the entire service life of the motor vehicle in question. As a rule, this requires the emergency battery to be replaced every few years. In addition, the emergency battery usually has to be charged externally or internally using the on-board battery. Nevertheless, malfunctions in the event of a crash cannot be ruled out with absolute certainty.

This is also due to the fact that the emergency battery, e.g., in the generic prior art according to DE 695 09 316 T2, is connected to the motor vehicle lock in conjunction with an interface in the interior of the associated motor vehicle door. In DE 10 2019 122 107 A1, an energy storage device with a capacitor for supplying voltage is arranged in the interior of the motor vehicle lock. As a result, regardless of any functional disturbances of the emergency battery, there is always the problem that the emergency battery will be damaged or destroyed in the event of an accident or crash, for example. This does not necessarily have to be caused by a corresponding mechanical influence, but can also be the result of, for example, overvoltages or heat or, in some cases, an explosion. In any case, the previous procedures have proven successful, but they reach their limits in the event that the emergency battery is destroyed or impaired in terms of its functionality—for example, in the event of a crash. The invention as a whole seeks to remedy this.

SUMMARY OF DISCLOSURE

The invention is based upon the technical problem of further developing such a motor vehicle, and in particular an electric or hybrid motor vehicle, in such a way that functional impairments of the emergency battery can be excluded as far as possible.

To solve this technical problem, a generic motor vehicle and in particular an electric or hybrid motor vehicle is characterized in the context of the invention in that the emergency battery is equipped with an emergency protection device.

According to the invention, the term emergency protection device is to be interpreted broadly. In fact, the emergency protection device ensures that the emergency battery is electrically and/or mechanically and/or thermally protected from emergency effects. In the context of the invention, electrical protection of the emergency battery means that no damage occurs to the emergency battery, particularly during and after a crash from, for example, a short circuit in the cable network, any overvoltages, etc. The invention is based upon the fundamental finding that electric or hybrid motor vehicles in particular, in addition to the on-board battery that typically operates with 12 V direct current, also have a traction battery that is generally operated with a significantly higher direct current or provides such a voltage for driving the electric motors. At this point, operating voltages in the high voltage range are observed, which can amount to several hundred volts. In the event of a crash, there is a risk that any overvoltages from the traction battery could damage the emergency battery, because it is generally charged using the on-board battery and/or the traction battery or both. In addition to the described overvoltages, possible short circuits can also be dangerous under certain circumstances and can damage the emergency battery during a crash to such an extent that it is subsequently no (longer) able to power the electromotive drive of the vehicle lock in the sense of an electrical opening.

For this purpose, the emergency protection device is advantageously designed as a short-circuit and/or overvoltage protection device. With the help of such a short-circuit device, it can be ensured, for example, that, in the event of a crash, the emergency battery is (galvanically) isolated from any voltage supply, existing during normal operation, using the on-board battery or the traction battery or both in order to protect the emergency battery. For this purpose, the emergency protection device can be connected to a control unit, which in turn evaluates signals from a crash sensor and, as a result, accordingly activates the short-circuit and/or overvoltage protection device. In fact, the overvoltage protection device of the emergency battery can ensure that, in the event of any overvoltages, the voltage supply to the emergency battery is opened, and the emergency battery as a whole is galvanically isolated from the cable network. This means that the short-circuit and/or overvoltage protection device ensures, typically and in a crash, that the emergency battery is galvanically isolated from the cable network of the motor vehicle and, accordingly, from the rest of the power supply, thus providing the protection desired and required for emergency operation.

Alternatively or additionally, the emergency protection device can also provide mechanical protection for the emergency battery. In this case, it has proven to be effective if the emergency protection device is designed as the emergency protection housing enclosing the emergency battery and mechanically protects the emergency battery. The emergency protection housing advantageously implemented at this point can be designed to be crush-proof and/or explosion-proof and/or fire-proof overall. A crush-protected design of the emergency protection housing corresponds to the fact that the emergency protection housing may be exposed to deformation forces in a crash, which are absorbed by a corresponding crush protection of the emergency protection housing comparable to the “crumple zone” generally known in motor vehicles. In other words, the emergency protection housing can be equipped with a crumple zone as a crush protection to avoid mechanical deformations or at least be able to absorb them to such an extent that the emergency battery located in the interior the emergency protection housing is not impaired in its function.

Alternatively or additionally, the emergency protection housing can also be designed to be explosion- and/or fire-proof. Explosion protection can be achieved, for example, by a stable and closed design of the emergency protection housing. Additional fire protection can be ensured by equipping the emergency protection housing on the outside and/or inside wall with a fire protection layer, which is designed, for example, on the basis of mineral fiber boards.

In addition, the emergency protection device additionally or alternatively ensures that the emergency battery is thermally protected against emergency effects. Associated emergency effects may include, for example, a fire or explosion being observed in somewhat or very close proximity of the emergency battery. In order to avoid temperatures at this point in the region of the emergency battery that would impair its function, the emergency protection device is advantageously designed as the temperature protection device, surrounding the emergency battery, which thermally protects the emergency battery. Such a temperature protection device can, for example, be designed as a cooling and/or heating device.

If cooling the emergency battery is required, it is recommended, for example, that the temperature protection device be designed as a Peltier device, i.e., that it use Peltier elements, with the help of which the emergency battery can be cooled electrically. In principle, it is of course also possible for the temperature protection device to ensure that the emergency battery will heat up if, for example, the motor vehicle in question has an accident in the Arctic Circle, and the emergency battery is exposed to arctic temperatures that are harmful to it. In this case, the temperature protection device can alternatively or additionally be designed as a heating wire device and ensure that the emergency battery is brought to a temperature required for its optimal operation.

In the context of a particularly preferred variant, the emergency battery is at least partially designed as a traction battery for driving the motor vehicle. In the event that the emergency protection device electrically protects the emergency battery, the latter can also be designed, at least in part, as a traction battery or a component thereof for driving the motor vehicle.

This means that, in these two cases, the invention relies on a special emergency battery or a special electrically operated emergency protection device, which ensures the control in emergency operation of the electromotively actuatable motor vehicle lock. The emergency battery in question is, at least in part, the traction battery typically used to drive the vehicle. The invention is based upon the realization that electric motor vehicles or hybrid motor vehicles, in addition to the on-board battery, which is still implemented and provided unchanged, typically have a traction battery which (exclusively) provides the drive for the motor vehicle in electric mode. For this purpose, the motor vehicle in question has at least one electric motor, which is driven with the aid of the traction battery, in order to either move the motor vehicle purely electrically or to support the drive with the aid of an internal combustion engine, for example.

The traction battery is realized and provided structurally and electrically independently of the on-board battery and is therefore usually not charged by an additionally realized generator (alternator), but, rather, by recuperators or at a charging station of an electric charging infrastructure.

For this reason, the supply voltage for the electric motor of the additional drive provided by such a traction battery is usually designed to be much higher than the vehicle electrical system voltage provided by the on-board battery, which typically assumes values of 12 V, 24 V or 48 V. In fact, such traction batteries usually operate at high voltage, which can be up to several hundred volts to nearly 1,000 V, whereas the vehicle electrical system voltage is typically restricted to a max. 48 V, if only to avoid any health hazards to users.

For this reason, the traction battery, which typically operates at high voltage, is usually designed to be completely separate, both mechanically and electrically, from the on-board battery and also from the on-board electrical system and the body of the motor vehicle. Mechanical separation of the traction battery is typically provided by a cage housing the traction battery or some other type of housing inside the body of the motor vehicle, if only to prevent damage to the traction battery in the event of a crash.

For this reason, the traction battery is usually placed in an underbody and away from the crumple zones of the associated motor vehicle. The electrical insulation is provided by supply lines that connect the traction battery in question to the at least one electric motor for driving the motor vehicle on the one hand, and to a charging socket on the other. The supply lines expressly do not use the body of the motor vehicle, as is regularly the case for the ground line or the negative terminal for the vehicle electrical system voltage and the on-board battery. Rather, the supply lines for the two poles of the traction battery, which usually operates with DC voltage, are expressly electrically insulated from the body. In any case, the traction battery is designed to be both mechanically and electrically separate from the on-board battery and thus from the vehicle electrical system voltage.

In the context of the invention, the traction battery functions at least partially as an emergency battery and/or electrically operating emergency protection device. The overall traction battery can be divided into at least two sections. The general approach is for at least one of these two sections to be equipped with the emergency protection device and define the emergency battery.

In concrete terms, this means that the section in question—in addition to the housing of the entire traction battery that is usually provided—has the emergency protection housing already described above. This emergency protection housing of the relevant section defining the emergency battery is—as described—usually designed to be crush-proof and/or explosion-proof and/or fire-proof. Overall, this means that, in a crash and even if the other second section fails, the section of the traction battery defining the emergency battery with its own emergency protection housing can still perform its function as an emergency battery without any changes.

This also applies in view of the fact that the emergency battery in question or the section of the traction battery defining the emergency battery is equipped with the temperature protection device. This means that the section of the traction battery defining the emergency battery is, if necessary, cooled in an emergency using the Peltier device, in order to at least mitigate the effects of the arising heat or an explosion on the emergency battery. As a result, the function of the section of the traction battery defining the emergency battery is guaranteed under practically all circumstances, even after an accident or in a crash, so that, with the help of the emergency battery in emergency operation, the electromotive drive of the motor vehicle lock is ensured, unchanged and reliably.

In this manner, even in the event of a crash or accident, or even if the on-board battery has other malfunctions, i.e., in emergency mode, it can be assumed that the section of the traction battery defining the emergency battery is still functional and can therefore be used as an emergency battery for operating the electromotive drive in the interior of the motor vehicle lock. The motor vehicle lock in question can be any conceivable motor vehicle lock present in or on the vehicle body. These include not only motor vehicle door locks, motor vehicle tailgate locks, or motor vehicle hood locks, but also locks on fuel filler flaps, loading flaps, or in the interior of the motor vehicle in connection with a glove compartment or other storage compartments, for example. In any case, all of these electromotively actuatable motor vehicle locks can be opened reliably even in emergency operation according to the invention, because, in emergency operation, the section of the traction battery defining the emergency battery is used, which is functional even in the event of a failure of the on-board battery and taking into account the emergency protection device provided according to the invention. These are the main advantages.

The object of the invention is also the at least partial use of a traction battery or at least a section of the traction battery of an electric or hybrid motor vehicle as an emergency battery in conjunction with an emergency protection device for energizing an electromotive drive of a motor vehicle lock in emergency operation.

In principle, the entire traction battery or all sections of the traction battery can define the emergency battery. As a rule, however, it is sufficient to define only a (small) section of the traction battery as an emergency battery and to equip it with the emergency protection device in the context of the invention in order to optimally protect the emergency battery in its functionality. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
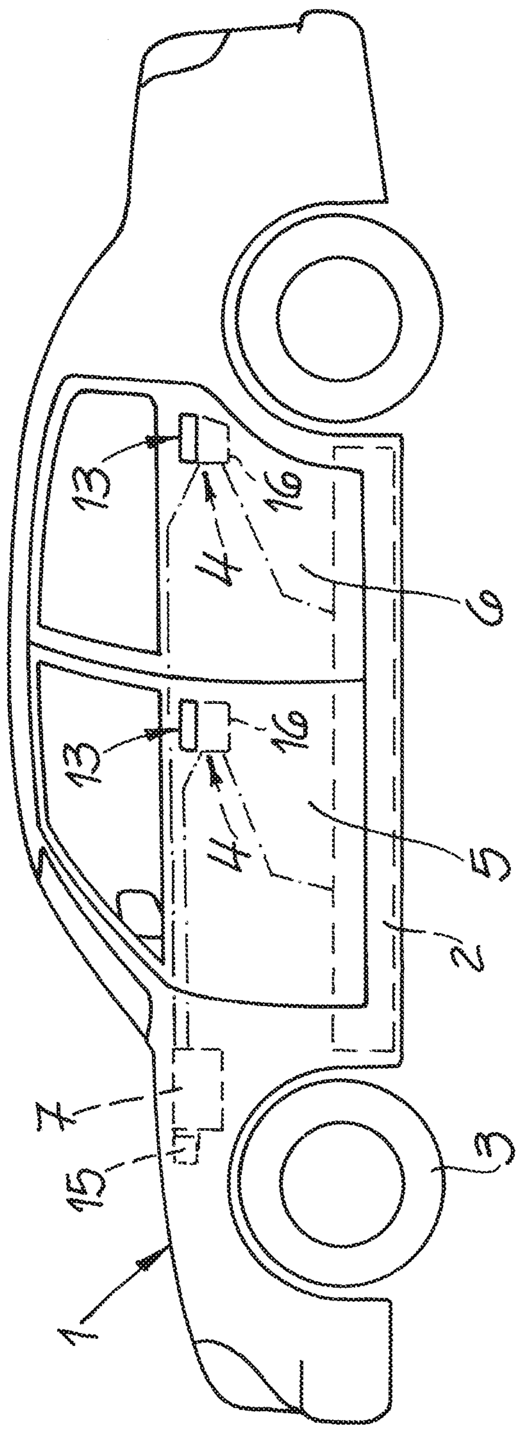
FIG. 1 schematically shows the motor vehicle according to the invention.

The figures show a motor vehicle which, according to the exemplary embodiment, is designed as an electric motor vehicle or hybrid motor vehicle. For this purpose, the motor vehicle first of all has a body 1. Inside the body 1, more precisely in or on its underbody, a traction battery 2 is realized, which is accommodated in its own housing or cage. The traction battery 2 usually extends in the space between the drive wheels 3 of the motor vehicle. FIG. 1 also shows two electromotively actuatable motor vehicle locks 4, viz., a motor vehicle lock 4 on a front side door 5 and another motor vehicle lock 4 on a rear side door 6. Of course, this applies only as an example and is in no way to be understood as restrictive.

The traction battery 2 can be used to supply one or more additional electric motors with electrical energy in order to drive the motor vehicle shown or the drive wheels 3. If the electric motors alone provide the drive, it is an electric vehicle. Alternatively, the motor vehicle can also operate as a hybrid motor vehicle. In this case, the one or more electric motors not expressly shown are implemented in addition to an internal combustion engine and provide the drive for the drive wheels 3 as an alternative or supplement to the relevant internal combustion engine.

In addition to the traction battery 2, the motor vehicle shown is also equipped with an on-board battery 7. The on-board battery 7 supplies an on-board electrical system and, inter alia, according to the exemplary embodiment, the two shown or all motor vehicle locks 4 with the required electrical energy.

Figure 2:
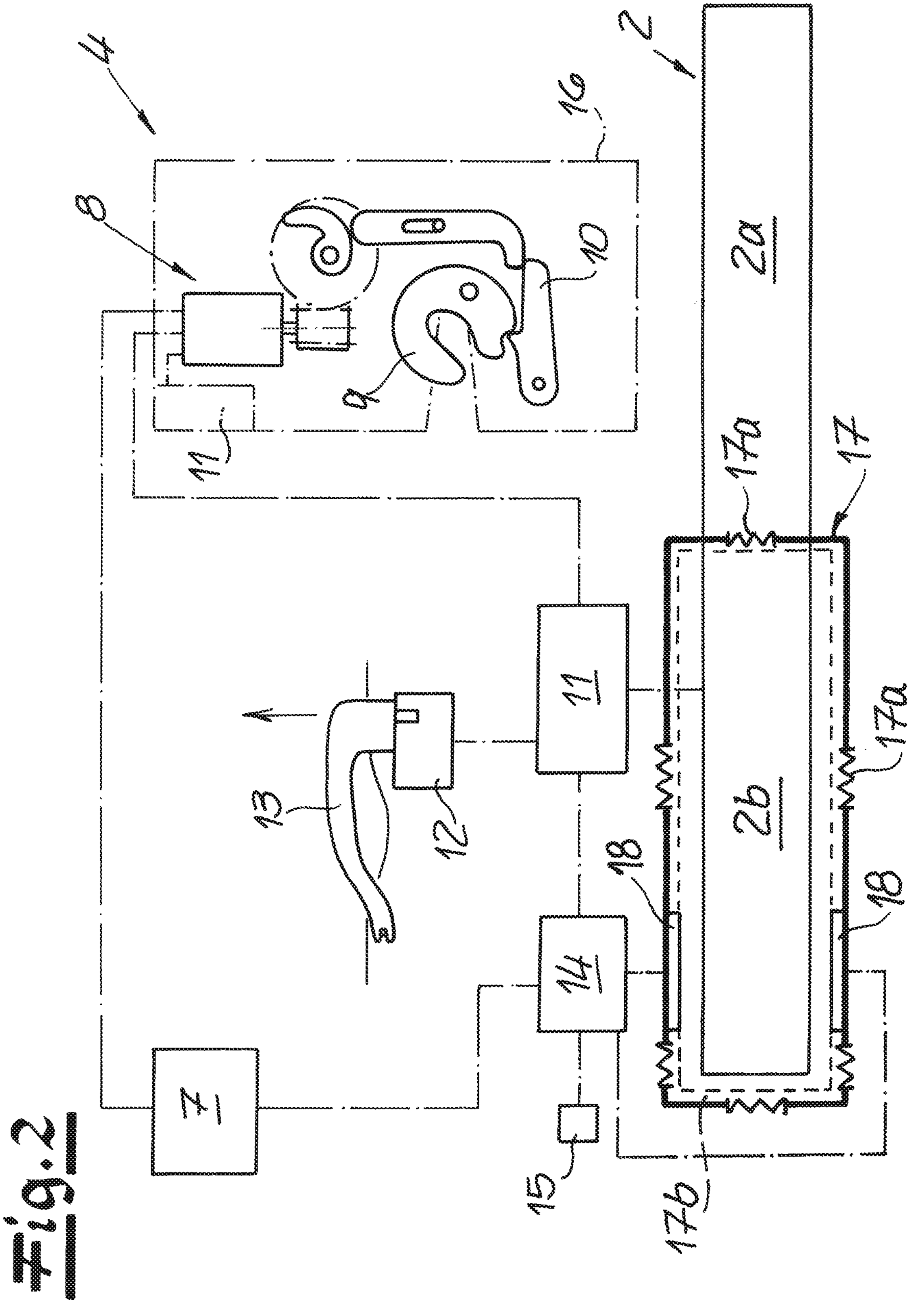
FIG. 2 shows the switching realized at this point for implementing emergency operation and the emergency battery in a detailed representation.

The motor vehicle lock 4 in question is in fact equipped with an electromotive drive 8, which is merely hinted at, and which can be used to open a locking mechanism 9, 10, schematically indicated in FIG. 2, consisting of catch 9 and pawl 10. In fact, according to the exemplary embodiment, the electromotive drive 8 operates indirectly or directly on the pawl 10 and lifts it from its latching engagement with the catch 9 to open the motor vehicle lock 4 electrically. As a result of this, a locking bolt that was previously caught by the catch 9 and is not expressly shown is released, so that the relevant motor vehicle door 5, 6 can then be opened. In normal operation, this is ensured by the on-board battery 7.

For this purpose, the on-board battery 7 operates with low DC voltage in the range of 12 V to approx. 48 V, as already described and explained at the beginning. In contrast, the traction battery 2 is designed to be mechanically and electrically separate from the on-board battery 7, because the traction battery 2 generally also works with DC voltage, albeit with a high voltage of several hundred volts in the example case.

As already explained, the on-board battery 7 ensures that the electromotive drive 8 of the relevant motor vehicle lock 4 is energized during normal operation. In accordance with the invention and in emergency operation, the traction battery 2 originally intended for driving the drive wheels 3 of the motor vehicle acts as the emergency battery for the electromotive drive 8 of the motor vehicle lock, viz., at least in part, as explained below. In detail, the traction battery 2 is electrically connected to the relevant motor vehicle lock 4 via a switchover device 11, 12. For this purpose, the switchover device 11, 12 has a switch device 12 that can be actuated during an opening operation of the motor vehicle lock 4.

According to the exemplary embodiment, the switch device 12 is provided and arranged on or in the region of an outside door handle 13. If, during emergency operation, the outside door handle 13 is actuated to open the motor vehicle lock 4, which corresponds to a movement indicated in the direction of the arrow in FIG. 2, this results in the switch device 12 being energized. In addition to the switch device 12, the switchover device 11, 12 in the exemplary embodiment also has a conversion unit 11. With the aid of the conversion unit 11, the electrical energy provided by the traction battery 2 in emergency operation is adapted to the requirements of the electromotive drive of the motor vehicle lock 4. For this purpose, the conversion unit 11 and thus the switchover device 11, 12 can be designed with a voltage-dependent resistor, not expressly shown, in the form of an electronic resistor and, for example, a varistor. In principle, however, it is also conceivable that the conversion unit 11 work with a relay in this context. Voltage-to-current converters and timers are also conceivable in order, for one, to adapt the electrical energy provided by the traction battery 2 to the requirements of the electromotive drive 8 of the motor vehicle lock 4 and, for another, to prevent, via the timer, the electromotive drive 8 from overheating or to ensure that it is switched off in good time during emergency operation.

Based upon FIG. 2, it can be seen that, additionally, another control unit 14 is provided. The design is such that the switchover device 11, 12 is actuated with the aid of said control unit 14 to switch from normal operation to emergency operation. For this purpose, the control unit 14 generally evaluates the signal from at least one sensor 15. The sensor 15 may be one that is used to monitor the vehicle electrical system voltage provided by the on-board battery 7. Alternatively or additionally, the sensor 15 can also be designed as a crash sensor. The switchover device 11, 12 can be installed as a whole or for the most part inside a motor vehicle lock housing 16, which is indicated by a dotted line in FIG. 2. This provides a particularly compact and cost-effective design.

From FIG. 2, it can also be seen that the traction battery 2 according to the exemplary embodiment is divided into two sections 2*a*, 2*b*. It can be seen that one of these two sections 2*a*, 2*b*—according to the exemplary embodiment, the left section 2*b*—is additionally equipped with an emergency protection device 17, 18, which is of particular importance according to the invention. In fact, the section 2*b* of the traction battery 2 equipped with the emergency protection device 17, 18 is designed as an emergency battery 2*b* in the exemplary embodiment, or defines the function of the emergency battery 2*b* already described in the introduction. In principle, the entire traction battery 2 could also work or function as an emergency battery 2. As a rule, however, it is sufficient to define one section—in this example, section 2*b*—of the traction battery 2 as emergency battery 2*b*.

The emergency protection device 17, 18 ensures that the emergency battery 2*b* is thereby protected against emergency effects. These emergency effects can be mechanical deformations, heat, explosions, overvoltage, short circuits, etc., as already described in detail in the introduction. In order for the emergency protection device 17, 18 to protect the emergency battery 2*b* from such emergency effects and for the functionality of the emergency battery 2*b* to still exist following, for example, an accident or crash, the emergency protection device 17, 18 in the example shown in FIG. 2 ensures that the emergency battery 2*b* is electrically, mechanically, and thermally protected.

The electrical protection of the emergency protection device 17, 18 is ensured in the context of the shown example by the switching device 11, 12, which may operate in conjunction with the control unit 14 in such a way that, in the event of a short circuit and/or overvoltage occurring in the emergency battery 2*b*, the emergency battery 2*b* is galvanically isolated from the cable network and thus protected.

The mechanical protection of the emergency protection device 17, 18 is realized in such a way that an emergency protection housing 17 is provided at this point, which is designed to be crush-proof and explosion- and fire-proof. For this purpose, the emergency protection housing 17 has crumple zones 17*a*, indicated in FIG. 2, which absorb mechanical deformations of the emergency protection housing 17 to a certain extent. Additional explosion or fire protection of the emergency protection housing 17 is ensured by the fact that, according to the exemplary embodiment, it is equipped with an internal cladding 17*b* of, for example, mineral fiber wool or other fire protection coatings.

In addition, the emergency protection device 17, 18 is also designed as a temperature protection device 18 surrounding the emergency battery 2*b*, or has such a device according to the exemplary embodiment. The temperature protection device 18 was a cooling device and specifically a Peltier device 18. The Peltier elements provided at this point are controlled by the control unit 14 and supplied with the required current in order to ensure any cooling of the emergency battery 2*b* if necessary. The electrical current may be provided by the traction battery and/or the on-board battery 7.

According to the exemplary embodiment, the detection of emergency operation and the energizing of the temperature protection device 18 by the control unit 14 when necessary is coupled to the fact that the sensor or crash sensor 15 sends a corresponding crash signal to the control unit 14. At the same time, the control unit 14 ensures in this case that, on the one hand, the switching device 11, 12 keeps any short circuits or overvoltages away from the emergency battery 2*b* by galvanically isolating it from the rest of the on-board network if necessary. Additionally, and on the other hand, in emergency operation and after evaluating the signal from sensor 15, the control unit 14 ensures that the switching device 11, 12 switches to emergency operation with the aid of control unit 14.

For this purpose, the active switching device 11, 12 in conjunction with the control unit 14 ensures that the electromotive drive 8 is no longer supplied with the required electrical energy by means of the on-board battery 7, but, rather, the required electrical energy is supplied via the section 2*b* or the emergency battery 2*b*. In this connection, the conversion unit 11, as a component of the switchover device 11, 12, ensures that the electrical power provided by the relevant section 2*b* of the traction battery 2 is adapted to the electrical power required by the electromotive drive 8. It also ensures that the electromotive drive 8 in emergency mode is only actuated, for example, for as long as is required following actuation of the switch device 12 with the aid of the outside door handle 13, until the catch 9 and thus the associated motor vehicle door 5, 6 is safely opened.

LIST OF REFERENCE SIGNS

Body 1
Traction battery 2
Section 2*a*, 2*b*
Emergency battery 2*b*
Drive wheels 3
Motor vehicle lock 4
Side door 5
Side door 6
On-board battery 7
Drive 8
Locking mechanisms 9, 10
Pawl 10
Switchover device 11, 12
Switching device 11
Switch device 12
Control unit 14
Sensor 15
Emergency protection device 17, 18
Emergency protection housing 17
Crumple zones 17*a*
Inside panel 17*b*
Peltier device 18

The invention claimed is:

1. A motor vehicle comprising:

at least one electromotively actuatable motor vehicle lock including an electromotive drive that is operable in a normal operation and in an emergency operation, at least one on-board battery for energizing the electromotive drive of the motor vehicle lock in the normal operation, an emergency battery for energizing the electromotive drive of the motor vehicle lock in the emergency operation, wherein the emergency battery is equipped with an emergency protection device, and a traction battery for driving the motor vehicle, wherein at least a portion of the traction battery acts as the emergency battery.

2. The motor vehicle according to claim 1, wherein the emergency protection device is configured to protect the emergency battery electrically and/or mechanically and/or thermally against emergency effects.

3. The motor vehicle according to claim 1, wherein the emergency protection device comprises a short-circuit and/or overvoltage protection device that electrically protects the emergency battery.

4. The motor vehicle according to claim 3, further comprising a crash sensor and a control unit that is configured to evaluate a signal from the crash sensor, wherein the control unit is configured to activate the short-circuit and/or overvoltage protection device based on the signal from the crash sensor to galvanically isolate the emergency battery from the on-board battery during the emergency operation.

5. The motor vehicle according to claim 1, wherein the emergency protection device comprises an emergency protection housing that houses the emergency battery to mechanically protect the emergency battery.

6. The motor vehicle according to claim 5, wherein the emergency protection housing is designed to be crush-proof and/or explosion-proof and/or fire-proof.

7. The motor vehicle according to claim 6, wherein the emergency protection housing includes a wall having a fire protection layer.

8. The motor vehicle according to claim 6, wherein the emergency protection housing includes at least one crumple zone that absorbs mechanical deformation of the emergency protection housing.

9. The motor vehicle according to claim 1, wherein the emergency protection device comprises a temperature protection device surrounding the emergency battery, which thermally protects the emergency battery.

10. The motor vehicle according to claim 9, wherein the temperature protection device comprises a cooling and/or heating device.

11. The motor vehicle according to claim 10, wherein the temperature protection device comprises a Peltier device and/or a heating wire device.

12. The motor vehicle according to claim 1, wherein the traction battery is divided into at least two sections.

13. The motor vehicle according to claim 12, wherein at least one section of the at least two sections of the traction battery is equipped with the emergency protection device and includes the portion that acts as the emergency battery.

14. The motor vehicle according to claim 13, wherein the at least one section includes a temperature protection device that operates to cool the at least one section during the emergency operation.

15. The motor vehicle according to claim 1, further comprising a switchover device that is activated to electrically connect the traction battery to the electromotive drive of the motor vehicle lock for operating the motor vehicle lock during the emergency operation.

16. The motor vehicle according to claim 15, wherein the switchover device comprises a switch and a conversion unit, the conversion unit being configured to convert the electrical supply of the traction battery to an operable electrical supply for the electromotive drive of the motor vehicle lock.

17. The motor vehicle according to claim 15, further comprising a sensor and a control unit that is configured to evaluate a signal from the sensor, wherein the control unit is configured to activate the switchover device based on the signal from the crash sensor.

18. The motor vehicle according to claim 17, wherein the sensor is one or more of a sensor that monitors electrical voltage provided by the on-board battery and a crash sensor.

19. A motor vehicle comprising:

at least one electromotively actuatable motor vehicle lock including an electromotive drive that is operable in a normal operation and in an emergency operation, at least one on-board battery for energizing the electromotive drive of the motor vehicle lock in the normal operation, an emergency battery for energizing the electromotive drive of the motor vehicle lock in the emergency operation, wherein the emergency battery is equipped with an emergency protection device, wherein the emergency protection device comprises a temperature protection device surrounding the emergency battery, which thermally protects the emergency battery, wherein the temperature protection device comprises a cooling and/or heating device, and wherein the temperature protection device comprises a Peltier device and/or a heating wire device.

* * * * *